United States Patent [19]

Carey

[11] 4,017,432

[45] Apr. 12, 1977

[54] POLYEPOXIDE COMPOSITIONS EXHIBITING IMPROVED PHYSICAL PROPERTIES

[75] Inventor: James E. Carey, Mullica Hill, N.J.

[73] Assignee: Shell Oil Company, Houston, Tex.

[22] Filed: Sept. 13, 1976

[21] Appl. No.: 722,848

Related U.S. Application Data

[63] Continuation-in-part of Ser. No. 623,521, Oct. 17, 1975, abandoned.

[52] U.S. Cl. .................. 260/18 EP; 260/2 EA; 260/47 EA
[51] Int. Cl.² .................................. C08G 59/14
[58] Field of Search ......... 260/18 EP, 47 EA, 2 EA

[56] References Cited

UNITED STATES PATENTS

| | | | |
|---|---|---|---|
| 2,848,433 | 8/1958 | Eirich | 260/18 EP |
| 2,970,231 | 1/1961 | Rogers, Jr. et al. | 260/18 EP |
| 3,018,259 | 1/1962 | Frostick, Jr. et al. | 260/18 EP |
| 3,446,762 | 5/1969 | Lopez et al. | 260/18 EP |
| 3,449,274 | 6/1969 | Salensky | 260/18 EP |
| 3,487,027 | 12/1969 | Case | 260/18 EP |
| 3,694,407 | 9/1972 | Kirkorian | 260/18 EP |
| 3,725,341 | 4/1973 | Rogers et al. | 260/18 EP |

OTHER PUBLICATIONS

B465375 U.S. Published Patent Application, McPherson, 4/13/76.

Primary Examiner—Eugene C. Rzucidlo
Attorney, Agent, or Firm—Norris E. Faringer

[57] ABSTRACT

Epoxy resins cured with a mixture of (1) a liquid dicarboxylic organic acid and (2) a polymeric fatty acid exhibit improved tensile strength and elongation.

15 Claims, No Drawings

POLYEPOXIDE COMPOSITIONS EXHIBITING IMPROVED PHYSICAL PROPERTIES

BACKGROUND OF THE INVENTION

This application is a continuation-in-part application of Ser. No. 623,521 field Oct. 17, 1975, now abandoned.

Dimer and trimer acids are produced commercially by polymerization of unsaturated $C_{18}$ fatty acids and as supplied, they are essentially mixtures of dimer ($C_{36}$ dibasic) and trimer ($C_{54}$ tribasic) acids and residual monocarboxylic acids. Those with high trimer content are designated trimer acids and those with dimer content, dimer acids.

These viscous, liquid organic acids find a wide variety of applications, including reacting with epoxy resins to produce electrical potting and encapsulating compositions, adhesives and laminates. See, for example, U.S. Pat. Nos. 3,324,041 and 3,446,762. Unfortunately, the commercially obtainable dimer and trimer acids are not generally compatible with epoxy resins at temperatures below about 125° C.

Certain dicarboxylic acids such as the $C_{21}$ dicarboxylic acid were found to be compatible with epoxy resins at about 50°–60° C; however, when such diacids were used to cure epoxy resins the resulting cured resins are not flexible enough for many end uses.

It has now been found, quite unexpectedly that mixtures of the polymeric acids and diacid are compatible with epoxy resins at 60° C to 125° C, especially at intermediate temperatures e.g., 60° to 90° C. It has also been found that the resulting cured compositions exhibit excellent improved tensile strength and elongation.

SUMMARY OF THE INVENTION

Epoxy compositions exhibiting tensile strengths of about 5000 psi and elongation of greater than 100% are prepared by reacting (1) a polyepoxide, preferably a glycidyl polyether of a polyhydric phenol, with (2) a curing amount of a blend or mixture of (a) a polymerized fatty acid and (b) an organic polycarboxylic acid.

DESCRIPTION OF THE PREFERRED EMBODIMENTS

Polyepoxides

The polyepoxide materials to be used in preparing the condensates of the present invention comprise those organic material which have more than one vic-epoxy group, i.e., more than one

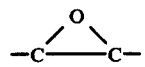

group, which group may be in a terminal position, i.e., a

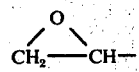

group, or in an internal position, i.e., a

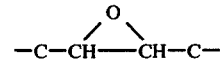

The polyepoxides may be saturated or unsaturated, aliphatic, cycloaliphatic, aromatic or heterocyclic and may be substituted with substituents, such as chlorine, hydroxyl groups, ether radicals, and the like.

Examples of such polyepoxides, include, among others, 1,4-bis(2,3-epoxypropoxy)benzene, 1,3-bis(2,3-epoxypropyl)benzene, 4,4'bis(2,3-epoxypropoxy)-diphenyl ether, 1,8-bis(2,3-epoxypropoxy)octane, 1,4-bis(2,3-epoxypropoxy)cyclohexane, 4,4'-bis(2-hydroxy-3,4'-epoxybutoxy) -diphenyl dimethylmethane, 1,3-bis(4,5-epoxypentoxy-5-chlorobenzene, 1,4-bis (3,4-epoxybutoxy)-2-cyclorocyclohexane, 1,3-bis(2-hydroxy-3,4-epoxybutoxy)benzene, 1,4-bis(2-hydroxy-4,5-epoxypentoxy)benzene.

Other examples include the epoxy polyethers of polyhydric phenols obtained by reacting a polyhydric phenol with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxypenyl)propane (Bis-phenol A), 2,2-bis(4-hydroxyphenol)butane, 4,4'-dihydroxybenzophenone, bis(4-hydroxyphenyl)ethane, 2,2-bis(4-hydroxyphenyl)pentane and 1,5-dihydroxynaphthalene. The halogen-containing epoxides may be further exemplified by 3-chloro-1,2epoxybutane, 3-bromo-1,2-epoxyhexane, 3-chloro-1,2-epoxyoctane, and the like. By varying the ratios of the phenol and epichlorohydrin one obtains different molecular weight products as shown in U.S. Pat. No. 2,633,458.

A preferred group of the above-described epoxy polyethers of polyhydric phenols are glycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C to 150° C. The heating is continued for several hours to effect the reaction and the product is then washed free of salt and base.

The preparation of suitable glycidyl polyethers of polyhydric phenols as well as examples of other suitable epoxy compounds are described in U.S. Pat. No. 3,219,602, and so much of that disclosure relevant to epoxy resins is incorporated herein by reference.

Polymeric Fatty Acids

The polymerized unsaturated long chain fatty acids suitable for use in the present invention are those obtained by polymerizing unsaturated long chain acids under known conditions such as heat, peroxides and the like.

The dimer acids comprise acids obtained by polymerizing unsaturated fatty acids, such as soya bean oil fatty acids and the like. Particularly preferred are the dimerized acids obtained from the ethylenically unsaturated fatty acids or mixtures thereof derived from semi-drying and drying oils, and particularly the conjugated fatty acids containing at least 12 and generally from about 12 to about 20 carbon atoms, such as 9,11- octadecadienoic acid and other acids within the generic formula

R—CH=CH—CH=CH—R₁ wherein R is a —R₂COOH radical, R₁ is either a —R₂-COOH group or an alkyl radical and R₂ is an alkyl radical. These acids polymerize to form dimer acids of the general formula

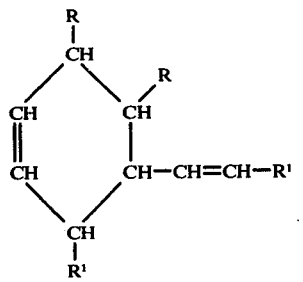

Other suitable dimer acids include those obtained from linoleic acid, linolenic acid, eleosteric acid, and ricinoleic acid. Still another group of dimers are those obtained from dibasic acids such as 8,12-eicosadiene-1,20-dioic acid, 8-vinyl-10-octadecene-1,18-dioic acid, 7,11-octadecadiene-1,18-dioic acid, and the like. As noted hereinbefore dimer and trimer acids are available commercially sold under various trade names. A suitable such acid includes Empol 1014a viscous aliphatic polybasic acid produced by the polymerization of unsaturated fatty acids at mid-molecule and containing 1% $C_{18}$ monobasic fatty acid, 95% $C_{36}$ dibasic fatty acid, and 4% $C_{54}$ tribasic fatty acid, acid value 188–193, saponification value 194–198 and neutralization equivalent 292–298. Another very suitable dimer acid is marketed as Empol 1016 (dimer acid of less than 1% monobasic acid; neutralization equivalent 284–295; acid value 190–198; and saponification value 194–200).

Particularly preferred are the trimerized acids obtained from the ethylenically unsaturated fatty acids as derived from semi-drying and drying oils, and particularly, the conjugated fatty acids containing from 12 to 20 carbon atoms. The generic structure of the resulting trimerized acids is believed to be that of the following:

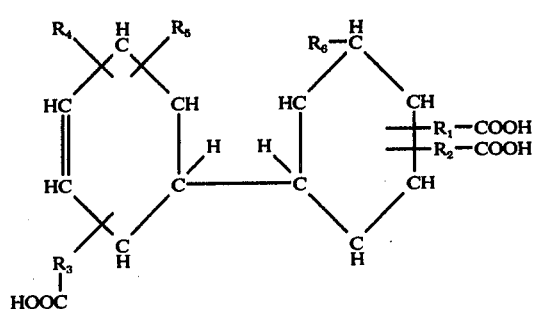

In the above formula, $R_1$, $R_2$ and $R_3$ constitute alkylene radicals having between 4 and 10 carbon atoms each, while $R_4$, $R_5$ and $R_6$ are alkyl radicals having between 4 and 10 carbon atoms each. Normally, the products will have the generic formula as follows.

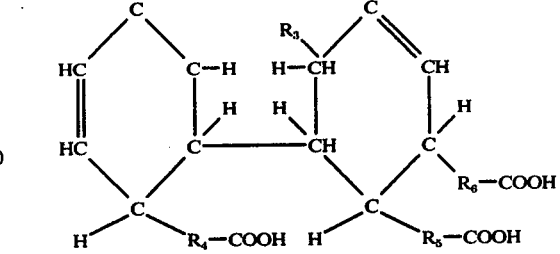

Particularly preferred are the $C_{36}$ dimerized fatty acids.

Organic Polybasic Acids

The organic polybasic acids useful in the present invention are the dicarboxylic fatty acids of the general formula:

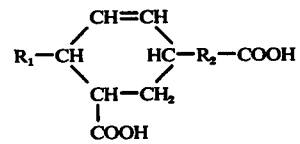

wherein $R_1$ is an alkyl group of up to about 10 carbon atoms and $R_2$ is an alkylene group of up to 12 carbon atoms.

A particularly useful acid is a liquid $C_{21}$ organic acid having the following type structure:

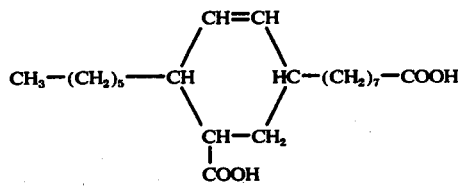

Catalysts

Although the epoxy-carboxyl reaction does not require a catalyst, it is usually desirable to utilize one.

Preferred catalysts include the imidazoles, benzimidazoles and their salts; stannous salts of monocarboxylic acids; organic phosphines; and phosphonium halides; and tertiary amines.

Suitable organic phospines are those having the general formula:

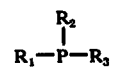

wherein each R is a hydrogen, an organic radical, particularly an alkyl or aryl radical. Useful phosphines include triphenyl phosphine and tributylphosphine among others. The phosphine catalyst is generally used in the range of about 0.05 to 5% by weight of reactants.

Suitable phosphonium halides include those of the general formula:

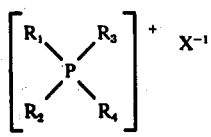

wherein X is a halogen and $R_1, R_2, R_3$ and $R_4$ are the same or different hydrocarbon radicals containing from 1 to 18 carbon atoms. The phosphonium halides are generally utilized in an amount from about 0.05 to 10% based on the weight of reactants.

Other suitable phosphines and phosphonium halides are disclosed in U.S. Pat. No. 3,738,862.

Suitable stannous salts are the stannous salts of monocarboxylic acids having at least 5 carbon atoms, preferably fatty acids containing from about 5 to about 20 carbon atoms and more preferably from about 6 to 12 carbon atoms. Preferred stannous salts are stannous caproate, stannous octoate, stannous laurate, stannous palmitate, stannous stearate, stannous oleate, and stannous naphthenate.

Suitable heterocyclic compounds possessing in the heterocyclic ring (1) a substituted C=N—C group and (2) a secondary amino group, i.e., an =N—H group, including the imidazoles, such as the substituted imidazoles and benzimidazoles having the structural formulae:

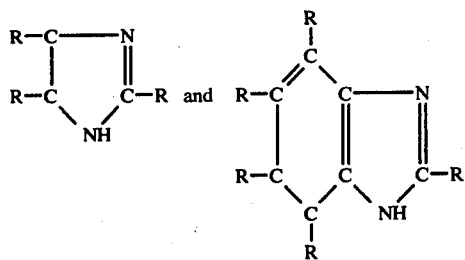

respectively, wherein R is selected from hydrogen atoms, halogen atoms, or an organic radical, such as a hydrocarbon radical or a substituted hydrocarbon radical, for example, the ester, ether, amide, imide, amino, halogen, or mercapto substituted hydrocarbon radicals. The acid portion of the salt is selected from an acid, such as phosphoric, acetic, lactic, formic, propionic, and the like. Especially preferred imidazoles are those wherein the substituent is hydrogen or a hydrocarbon radical and preferably an alkyl, alkenyl, cycloalkyl, cycloalkenyl, aryl, alkaryl or arylalkyl radicals, and particularly those containing no more than 15 carbon atoms and wherein the acid is selected from monocarboxylic acids having from 1 to 8 carbon atoms, lactic, and phosphoric acids.

A more detailed description of the chemistry of the imidazoles and benzimidazoles including their properties and structural formulas is found in the book by Klaus Hofmann entitled "Imidazole and Its Derivatives"published by Interscience Publishers, Inc., New York (1953). Examples of imidazole salts include, among others, the acetate, formate, lactate, and phosphate salts of imidazole, benzimidazole and substituted examples of suitable substituted imidazoles include: 2-methylimidazole: 2ethyl-4methylimidazole; 2-cyclohxyl-4-mthylimidazoles; 4-butyl-5ethylimidazole; 2-butoxy-4-allylimidazole; 2-carboethioxybutyl-4-methylimidazole; 2-octyl-4-hexylimidazole; 2-methyl-5-ethylimidazole; 2methyl-4-(2ethylamino-imidazole; 2-methyl-4-mercaptoethylimidazole; 2,5-chloro-4-ethylimidazole; and mixtures thereof. Especially preferred are the alkyl-substituted imidazole acetates and lactates wherein the alkyl groups contain not more than 8 carbon atoms each, or mixtures thereof, and particularly preferred are 2-ethyl-4methyl-imidazole acetate, 2-ethyl-4methylimidazole lactate, 2-methylimidazole acetate, 2-methylimidazole lactate, imidazole acetate; imidazole lactate, and mixtures thereof.

Suitable tertiary amines may be either aliphatic or aromatic substituted derivatives such as trimethylamine, triethylamine, benzyldimethylamine, alpha-methylbenzyl dimethylamine, dimethyl amino methyl phenol (DMP-10), tridimethyl amino methyl phenol (DMP-30), and the like. In some instances, tertiary amine salts may be useful such as DMP30 triacetate, DMP-30 tribenzoate, and the tri-2-ethyl hexoate salt of DMP-30.

An especially preferred tertiary amine is benzyldimethylamine (BDMA).

Since both the polymerized fatty acids and the organic polybasic acids employed in the curing blend are effective curing agents for epoxy resins, it is believed that the ratios of the acid components can be varied within wide limits; however, the weight ratio of polymeric fatty acid to organic polybasic acid in the curing blend will generally be from about 1:10 to 10:1 and preferably from about 1:5 to 5:1 to achieve the highest tensile elongation together with maximum strength and compatibility.

The epoxy resin is reacted with the carboxylic acid blend at a temperature from about 60° to about 125° C, preferably from 60° to 90° C for about 0.5 to 2 hours.

In general, stoichiometric amounts of the carboxyl-containing blend component and epoxy component are utilized, although from about 0.75 to 1.25 equivalents of polyepoxide are reacted with the carboxyl-containing blend.

To illustrate the manner in which the invention may be carried out, the following illustrative examples are given and the invention is not to be regarded as limited to any specific conditions or reactants recited therein. Unless otherwise indicated, parts are parts by weight.

EXAMPLES

One hundred parts by weight of EPON Resin 828 (a diglycidyl polyether of Bisphenol A having an average molecular weight of about 380 and an epoxide equivalent weight of 180) were mixed and reacted with various blends of (1) EMPOL Dimer Acid 1016 (a dimerized $C_{36}$ fatty acid having a neutralization equivalent of 284–295) and acid value of 190–198; a saponification value of 94–200; a Gardner 1963 color of 7 max; and containing less than 1% $C_{18}$ monobasic fatty acids) and (2a liquid organic $C_{21}$ diacid of the general structure:

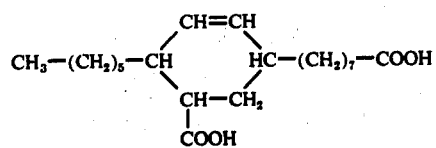

In Experiments 1,2 and 3 an imidazole propylene oxide adduct was used as a curing catalyst and in Experiments 4, 5 and 6 methyltetrahydrophthalic anhydride (MTHPA) was employed in combination with triphenylphosphine as a co-curing agent/catalyst combination.

All systems were compatible in the EPON Resin 828° at 90° C. Castings prepared from the above formulations were allowed to gel at 90° C. for two hours and then post cured for two hours at 150° C.

The resulting data is tabulated in Table I.

TABLE I

PROPERTIES OF DIMER - DIACID FORMULATIONS

Composition (Parts by Weight)

| Experiment | EPON Resin 828 | Dimer 1016 | $C_{21}$ Diacid | MTHPA | Imidazole-Propylene Oxide Adduct | BDMA | TPP |
|---|---|---|---|---|---|---|---|
| 1 | 100 | 53.5 | 25.5 | — | 0.9 | — | — |
| 2 | 100 | 50 | 50 | — | 1.5 | — | — |
| 3 | 100 | 27 | 27 | — | 0.5 | — | — |
| 4 | 100 | 60 | 37.5 | 22.5 | — | — | 2 |
| 5 | 100 | 89.9 | 18.5 | 22.5 | — | — | 2 |
| 6 | 100 | 29.9 | 56.2 | 22.5 | — | — | 2 |
| 7 | 100 | 40 | 40 | — | 1.5 | — | — |
| 8 | 100 | 43 | 11 | — | 1.5 | — | — |
| 9 | 100 | 11 | 43 | — | 1.5 | — | — |
| 10 | 110 | 37.2 | 37.2 | — | 1.0 | — | — |
| 11 | 110 | 37.2 | 37.2 | — | — | 1.5 | — |

Physical Properties

| Exp. | Hardness Shore D | Izod Impact ft-lb/in Unnotched | HDT °C | R. T. Tensile PSI Max | R. T. Tensile PSI Ult | R. T. Tensile Elong. % Max | R. T. Tensile Elong. % Ult |
|---|---|---|---|---|---|---|---|
| 1 | 67 | 15.9 | 26 | 4537 | — | 100 | — |
| 2 | 55 | 12.7 | — | 960 | 960 | 205 | 205 |
| 3 | 66 | 17.3 | — | 4333 | — | 87 | — |
| 4 | 65 | | | 3850 | 3800 | 220 | 220 |
| 5 | 50 | | | 4300 | 4300 | 270 | 270 |
| 6 | 65 | | | 5300 | 3600 | 85 | — |
| 7 | — | 21.4 | | 2575 | 2575 | 100 | 100 |
| 8 | 60 | | 50 | 5850 | 5850 | — | 177 |
| 9 | 73 | | 54 | — | 10000 | — | 4.4 |
| 10 | 80 | 12.1 | — | — | 4100 | — | 43 |
| 11 | 75 | 21.1 | | 3500 | 3500 | | 110 |

We claim as our invention:

1. A compatilizable, curable composition comprising (1) a polyepoxide having at least one vicinal epoxy group and (2) a curing amount of a blend of (a) a polymerized fatty acid derived from unsaturated fatty acids having at least 12 carbon atoms in the molecule and (b) a liquid organic polycarboxylic acid of the general formula:

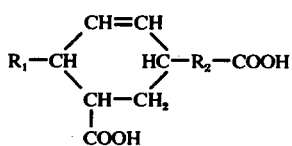

wherein $R_1$ is an alkyl radical and $R_2$ is an alkylene radical, the weight ratio of (a) to (b) being from about 1:10 to about 10;1.

2. The composition of claim 1 wherein the weight ratio of (a) to (b) from about 1:5 to about 5:1.

3. The composition of claim 1 wherein the polymerized fatty acid is a dimer acid comprising acids derived from fatty acids of the general formula R—CH=λ CH—CH=CH—$R_1$ wherein R is —$R_2$ COOH, $R_1$ is selected from R and $R_2$ and $R_2$ is an alkyl group, said acid having from 12 to 20 carbon atoms.

4. The composition of claim 3 wherein the polymerized fatty acid is a $C_{36}$ dimer fatty acid.

5. The composition of claim 1 wherein the polyepoxide is a diglycidyl polyether of 2,2-bis(4-hydroxyphenyl)propane.

6. The composition of claim 5 wherein the polyepoxide is a liquid.

7. The composition of claim 1 wherein $R_1$ is an alkyl radical of 6 carbon atoms and $R_2$ is an alkylene radical of 7 carbon atoms.

8. The composition of claim 1 wherein an acid anhydride is added as a co-curing agent.

9. The composition of claim 1 wherein a curing accelerator is additionally employed.

10. The composition of claim 9 wherein the curing accelerator is an organic phospine.

11. The composition of claim 9 wherein the curing accelerator is an imidazole compound.

12. The composition of claim 9 wherein the curing accelerator is a tertiary amine.

13. The composition of claim 12 wherein the tertiary amine is benzyldimethylamine.

14. The composition of claim 1 cured at about 60° to 125° C.

15. The composition of claim 14 cured at about 60° to 90° C for about 0.5 to 2 hours.